(12) United States Patent
Jeon et al.

(10) Patent No.: US 8,284,180 B2
(45) Date of Patent: Oct. 9, 2012

(54) LIQUID CRYSTAL DISPLAY DEVICE

(75) Inventors: Jin-Hwan Jeon, Suwon (KR); Jong-Ho Lim, Dagu (KR); Byung-Sam Min, Yanghu (KR)

(73) Assignee: LG Display Co., Ltd., Seoul (KR)

( * ) Notice: Subject to any disclaimer, the term of this patent is extended or adjusted under 35 U.S.C. 154(b) by 482 days.

(21) Appl. No.: 12/542,194

(22) Filed: Aug. 17, 2009

(65) Prior Publication Data

US 2010/0134464 A1 Jun. 3, 2010

(30) Foreign Application Priority Data

Nov. 28, 2008 (KR) .................. 10-2008-0120098

(51) Int. Cl.
*G09G 5/00* (2006.01)
(52) U.S. Cl. ...................................... 345/211; 345/210
(58) Field of Classification Search ............... 345/76–78, 345/87–93, 100–102, 204–215
See application file for complete search history.

(56) References Cited

U.S. PATENT DOCUMENTS

| 2008/0088550 A1* | 4/2008 | Kim et al. ................. 345/82 |
| 2008/0174731 A1* | 7/2008 | Kang et al. ............... 349/150 |
| 2011/0043112 A1* | 2/2011 | Brown et al. ............. 315/32 |

* cited by examiner

*Primary Examiner* — Vijay Shankar
(74) *Attorney, Agent, or Firm* — Brinks Hofer Gilson & Lione

(57) ABSTRACT

The present disclosure relates to a liquid crystal display (LCD) device and, more particularly, to an LCD device capable of driving a light emitting diode (LED) provided to turn on a fluorescent lamp provided as a light source in darkness by using an induced voltage without employing a driving circuit to thus minimize a fabrication cost and power consumption.

An LCD device according to the embodiment of the present invention, when the power voltage is applied to the power supply line to drive the fluorescent lamp, the LED is driven by the power voltage and, at the same time, the power voltage is supplied also to the fluorescent lamp. Thus, light emitted from the LED helps early turn on the fluorescent lamp when the fluorescent lamp is driven in darkness.

5 Claims, 4 Drawing Sheets

LIQUID CRYSTAL DISPLAY DEVICE

This application claims the benefit of Korean Patent Application No. 10-2008-0120098 filed on Nov. 28, 2008, the entire content which is hereby incorporated by reference.

BACKGROUND

1. Field of the Disclosure

The present disclosure relates to a liquid crystal display (LCD) device and, more particularly, to an LCD device capable of driving a light emitting diode (LED) provided to turn on a fluorescent lamp provided as a light source in darkness by using an induced voltage without employing a driving circuit to thus minimize a fabrication cost and power consumption.

2. Description of the Related Art

In general, the application coverage of a liquid crystal display (LCD) extends because of its characteristics that it is lighter, thinner, and driven at a low power consumption. Thus, the LCD is commonly used as a means for displaying images in mobile computers, mobile phones, office automation equipment, or the like.

The LCD displays a desired image on its screen by controlling the amount of transmission of light according to a video signal applied to a plurality of control switching elements arranged in a matrix form.

The LCD includes a liquid crystal panel including a color filter substrate, an upper substrate, and a thin film transistor (TFT) substrate, a lower substrate, which face, between which and a liquid crystal layer is formed, and a driver that supplies a scan signal and image information to the liquid crystal panel to operate the liquid crystal panel.

The LCD is not a self-emissive display device which does not emit light by itself, so it requires a light source for providing light to the liquid crystal panel. Thus, the LCD includes a backlight assembly including a light source to supply light to the liquid crystal panel, and a light guide plate and an optical sheet to convert light emitted from the light source into white uniform plane light.

A light source for generating light in the backlight assembly includes a CCFL (Cold Cathode Fluorescent lamp), an EEFL (External Electrode Fluorescent Lamp), the LED, or the like.

The general LCD will now be described with reference to the accompanying drawings.

As shown in FIG. 1, the general LCD includes a liquid crystal panel 1, a plurality of fluorescent lamps 2 disposed under the liquid crystal panel and supplying light to the liquid crystal panel 1, an optical sheet 11 for converting light emitted from the fluorescent lamps 2 and supplying the converted light to the liquid crystal panel 1, a lower cover 9 for receiving the plurality of fluorescent lamps, and a timing controller 10 disposed on a rear surface of the lower cover 9 and driving the liquid crystal panel 1.

A light emitting diode (LED) 8 for improving dark lighting is mounted on the timing controller 10, and an LED driving unit (not shown) for driving the LED 8 is also mounted thereon. A hole 10a is formed at a position of the lower cover 9 corresponding to the LED 8 to allow light emitted from the LED 8.

The general LCD having such configuration is advantageous in that the fluorescent lamps 2 are turned on in darkness by using light emitted from the LED 8, but disadvantageous in that power is consumed to drive the LED driving unit to increase power consumption. Also, the LED driving unit includes a plurality of circuit elements, increasing the size of the timing controller 10 on which the LED driving unit is mounted and increasing the fabrication cost. In addition, when the fluorescent lamps 2 are turned on in darkness, if a sequence related to a point of time at which a power voltage is applied to the fluorescent lamps 2 and a sequence related to a point of time at which the LED 8 is driven are not matched, the fluorescent lamps 2 would not be turned on.

SUMMARY

This specification provides a liquid crystal display (LCD) device including: a liquid crystal panel; a plurality of fluorescent lamps disposed under the liquid crystal panel, supplying light to the liquid crystal panel, and having electrodes provided at both ends thereof; a balance printed circuit board (PCB) disposed at both ends of the plurality of fluorescent lamps and including a clip fastened to be electrically connected with the electrodes of the fluorescent lamps; a power supply line printed on the balance PCB so as to be electrically connected to the clip and supplying power to the electrodes of the fluorescent lamps; a first voltage induction line printed with a first area on the balance PCB at a first interval from the power supply line; a second voltage induction line printed with a second area on the balance PCB at a second interval from the power supply line; and a light emitting diode (LED) mounted on the balance PCB and having an anode connected to the first voltage induction line and a cathode connected to the second voltage induction line, wherein the first area is larger than the second area, the first interval is smaller than the second interval, the power supply line and the first voltage induction line form a first capacitor, and the power supply line and the second voltage induction line form a second capacitor.

DETAILED DESCRIPTION OF THE INVENTION

A liquid crystal display (LCD) device according to embodiments of the present invention will now be described in detail with reference to the accompanying drawings.

Figure 1:
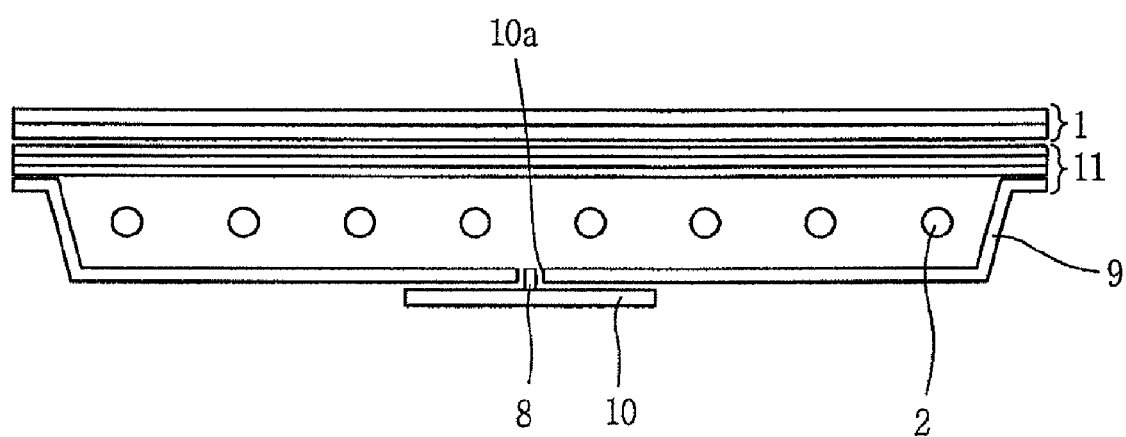
FIG. 1 is a sectional view of a general liquid crystal display (LCD) device.
Figure 2:
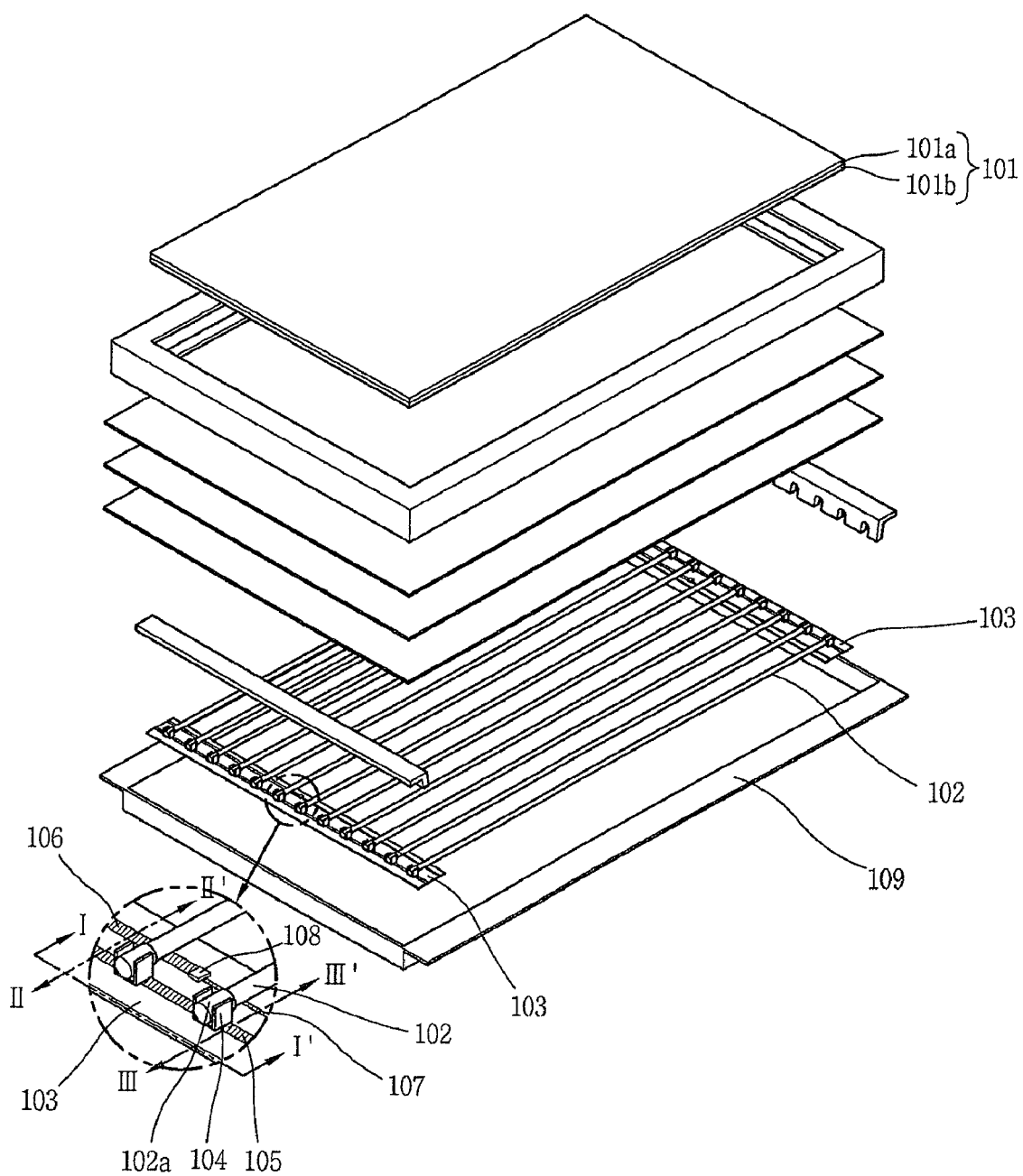
FIG. 2 is an exploded perspective view showing an LCD device according to an embodiment of the present disclosure.

As shown in FIG. 2, the LCD device according to an embodiment of the present invention includes: a liquid crystal panel 101; a plurality of fluorescent lamps 102 disposed under the liquid crystal panel 101, supplying light to the liquid crystal panel 101, and having electrodes 102a provided at both ends thereof; a balance printed circuit board (PCB) disposed at both ends of the plurality of fluorescent lamps 102 and including a clip 104 fastened to be electrically connected with the electrodes 102a of the fluorescent lamps 102; a power supply line 105 printed on the balance PCB 103 so as to be electrically connected to the clip 104 and supplying power to the electrodes 102a of the fluorescent lamps 102; a first voltage induction line 106 printed with a first area on the balance PCB 103 at a first interval (d1 in FIG. 4) from the power supply line 105; a second voltage induction line 107 printed with a second area on the balance PCB 103 at a second interval (d2 in FIG. 5) from the power supply line 105; and a light emitting diode (LED) 108 mounted on the balance PCB 103 and having an anode connected to the first voltage induction line 106 and a cathode connected to the second voltage induction line 107.

Here, the first area is larger than the second area, the first interval d1 is smaller than the second interval d2, the power supply line 105 and the first voltage induction line 106 form a first capacitor C1, and the power supply line 105 and the second voltage induction line 107 form a second capacitor C2.

The elements of the LCD device with such configuration according to the embodiment of the present invention will now be described.

With reference to FIG. 2, the liquid crystal panel 101 includes a color filter substrate 101a, an upper substrate, and a thin film transistor (TFT) array substrate 101b, a lower substrate. Although not shown, a liquid crystal layer is formed between the two substrates 101a and 101b.

A plurality of fluorescent lamps 102 are provided below the liquid crystal panel 101 to provide light to the liquid crystal panel 101.

The fluorescent lamp 102 includes a glass tube and electrodes 102a made of metal and provided at both ends outside the glass tube. The glass tube has a tubular shape with both ends sealed, in which a discharge gas such as neon (Ne), argon (Ar), mercury (Hg), and the like. Phosphor is coated on the inner wall of the fluorescent lamp 102.

In the following description, external electrode fluorescent lamps (EEFLs) will be taken as an example of the fluorescent lamps 102, but the present invention is not limited thereto and the fluorescent lamps 102 may be cold cathode fluorescent lamps (CCFLs) within the scope of the present invention.

With reference to FIG. 2, the plurality of fluorescent lamps 102 are disposed within a lower cover 109, and the balance PCBs 103 are disposed at both sides adjacent to the electrodes 102a of the fluorescent lamps 102 at an inner side of the lower cover 109.

With reference to FIG. 2, if the fluorescent lamps 102 are disposed in a first direction at the inner side of the lower cover 109, the balance PCBs 103 are disposed in a second direction perpendicular to the first direction.

A base of the balance PCBs 103 are made of an insulation material, and the power supply line 105 for supplying a power voltage to the electrodes 102a of the fluorescent lamps 102 is printed in the section direction on the balance PCBs 103. A first voltage induction line 106 having a first area and spaced apart at a first interval (d1 in FIG. 4) from the power supply line 105 is printed in a second direction. A second voltage induction line 107 having a second area and spaced apart at a second interval (d2 in FIG. 5) from the power supply line 105 is printed in the second direction. At this time, the first area of the first voltage induction line 106 is larger than the second area of the second voltage induction line 107, and the first interval d1 between the power supply line 105 and the first voltage induction line 106 is smaller than the second interval d2 between the power supply line 105 and the second voltage induction line 107.

The power supply line 105 and the first voltage induction line 106 form the first capacitor C1 with the base of the balance PCD interposed therebetween, and the power supply line 105 and the second voltage induction line 107 form the second capacitor C2 with the base of the balance PCB 103 interposed therebetween.

Figure 3:
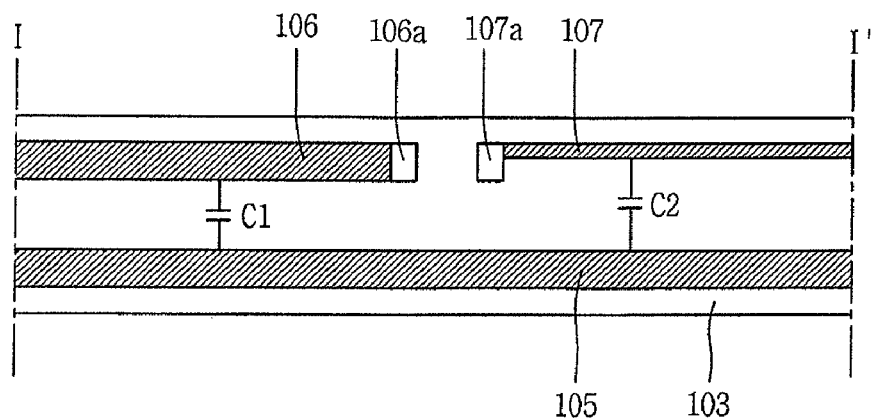
FIG. 3 is a horizontal sectional view taken along line I-I' of FIG. 2.

With reference to FIG. 3, the balance PCB 103 includes a clip 104 fastened to the electrode 102a of the fluorescent lamp 102. The clip 104 is electrically connected with the power supply line 105.

The clip 104 is made of an insulation material. Only a portion contacting with the electrode 102a of the fluorescent lamp 102 may be made of metal, or the entirety of the clip 104 may be made of metal. In either case, the clip 104 is connected with the power supply line 105 through soldering.

With reference to FIG. 2, the LED 108 having an anode connected with the first voltage induction line 106 and a cathode connected with the second voltage induction line 107 is mounted on the balance PCB 103. The anode and cathode of is the LED 108 are connected to the first voltage induction line 106 and the second voltage induction line 107 through soldering.

The LED 108 is driven by a difference between a voltage induced to the first capacitor C1 and a voltage induced to the second capacitor C2 when power voltage is applied to the power supply line 105. This will now be described in detail with reference to FIGS. 3 to 6.

FIG. 3 is a horizontal sectional view taken along line I-I' of FIG. 2, showing the power supply line 105, the first voltage induction line 106 and the second voltage induction line 107 at an inner side of the balance PCB 103. With reference to FIG. 3, the power supply line 105 and the first voltage induction line 106 form the first capacitor C1 with the base of the balance PCB interposed therebetween, and the power supply line 105 and the second voltage induction line 107 form the second capacitor C2 with the base of the balance PCB interposed therebetween. For reference, regions 106a and 107a to be soldered with the anode and cathode of the LED 108 are provided at the end portions of the first voltage induction line and second voltage induction line 107 in FIG. 3.

Figure 4:
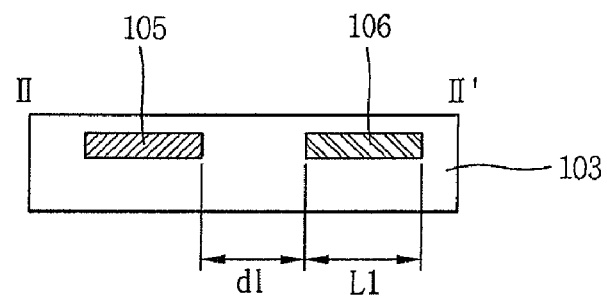
FIG. 4 is a vertical sectional view taken along line II-II' of FIG. 2.
Figure 5:
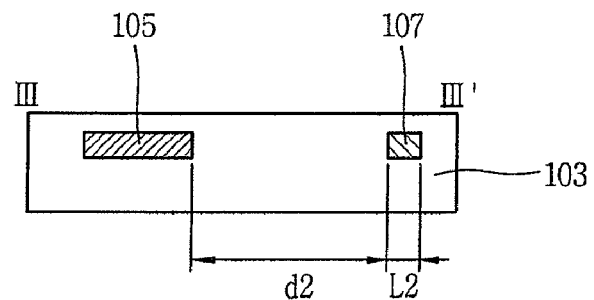
FIG. 5 is a vertical sectional view taken along line III-III of FIG. 2.

FIG. 4 is a vertical sectional view taken along line II-II' of FIG. 2, showing the power supply line 105 and the first voltage induction line 106 at the inner side of the balance PCB 103. FIG. 5 is a vertical sectional view taken along line of FIG. 2, showing the power supply line 105 and the second voltage induction line 107 at the inner side of the balance PCB 103. With reference to FIGS. 4 and 5, the width L1 of the first voltage induction line 106 is larger than the width L2 of the second voltage induction line 107, the first area of the first voltage induction line 106 is larger than the second area of the second voltage induction line 107, and the interval d1 between the power supply line 105 and the first voltage induction line 106 is larger than the interval d2 between the power supply line 105 and the second voltage induction line 107. Accordingly, the capacitance of the first capacitor C1 formed by the power supply line 105 and the first voltage induction line 106 is larger than that of the second capacitor C2 formed by the power supply line 105 and the second voltage induction line 107.

Figure 6:
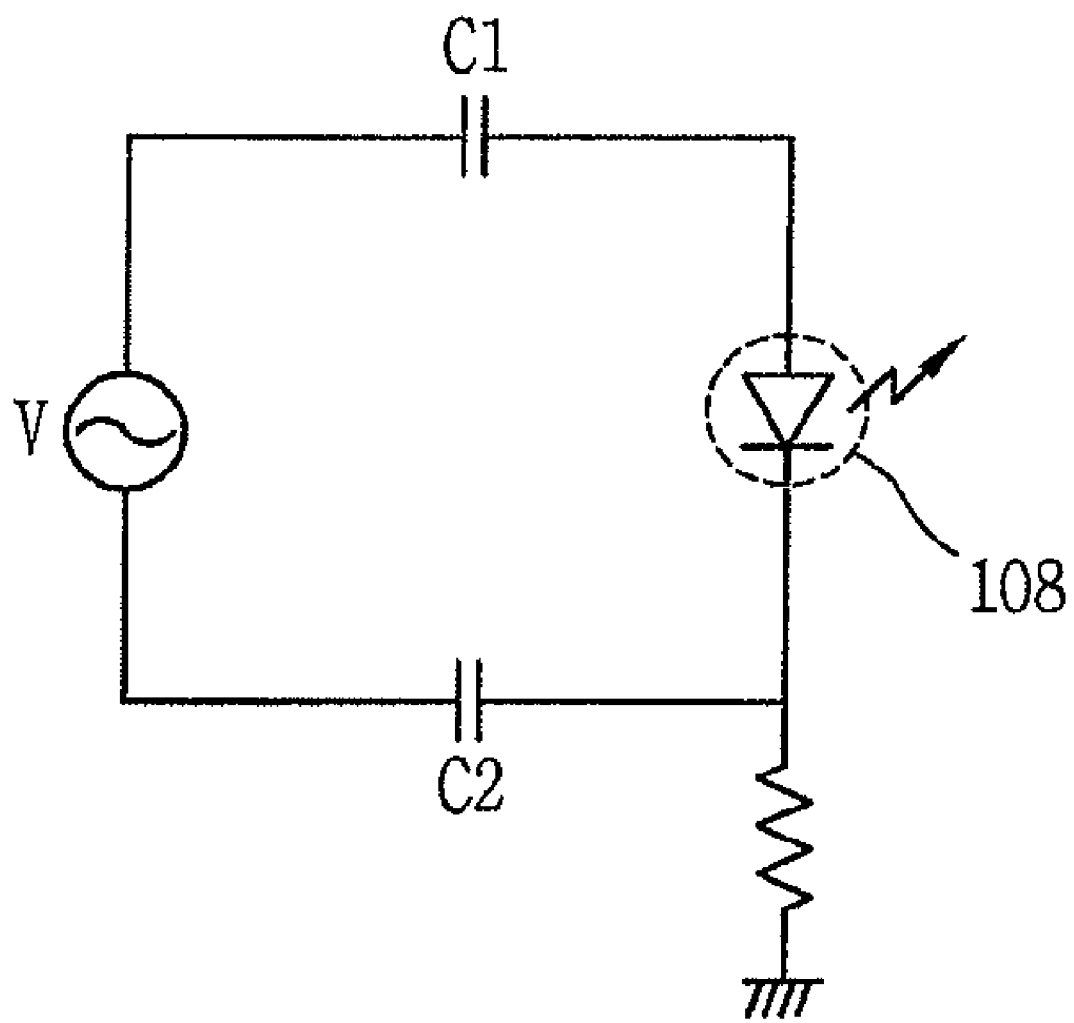
FIG. 6 is an equivalent circuit diagram of a power voltage, a first capacitor, a second capacitor, and a light emitting diode of FIG. 3.

FIG. 6 is an equivalent circuit diagram of a power voltage V applied to the power supply line 105, the first capacitor C1, the second capacitor C2, and the LED 108. As shown in FIG. 6, because the capacitance of the first capacitor C1 is larger than that of the second capacitor C2, the voltage at both ends of the first capacitor C1 is smaller than the voltage at the both ends of the second capacitor C2, and accordingly, voltage applied to the anode of the LED 108 is larger than the voltage applied to the cathode of the LED 108. Thus, the LED 108 is driven by the voltage difference.

As so far described, in the LCD device according to the embodiment of the present invention, when the power voltage V is applied to the power supply line 105 to drive the fluorescent lamp 102, the LED 108 is driven by the power voltage V2 and, at the same time, the power voltage V is supplied also to the fluorescent lamp 102. Thus, light emitted from the LED 108 helps early turn on the fluorescent lamp 102 when the fluorescent lamp 102 is driven in darkness.

In addition, because the LED 108 provided to turn on the fluorescent lamp 102 in darkness is driven with the induced voltage by using the first and second voltage induction lines 106 and 107, the fabrication cost and power consumption can be minimized. Also, when the fluorescent lamp 102 is turned in darkness, the LED 108 and the fluorescent lamp 102 simultaneously start to be driven, without the necessity of sequence controlling.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A liquid crystal display (LCD) device comprising:
    a liquid crystal panel;
    a plurality of fluorescent lamps disposed under the liquid crystal panel, supplying light to the liquid crystal panel, and having electrodes provided at both ends thereof;
    a balance printed circuit board (PCB) disposed at both ends of the plurality of fluorescent lamps and including a clip fastened to be electrically connected with the electrodes of the fluorescent lamps;
    a power supply line printed on the balance PCB so as to be electrically connected to the clip and supplying power to the electrodes of the fluorescent lamps;
    a first voltage induction line printed with a first area on the balance PCB at a first interval from the power supply line;
    a second voltage induction line printed with a second area on the balance PCB at a second interval from the power supply line; and
    a light emitting diode (LED) mounted on the balance PCB and having an anode connected to the first voltage induction line and a cathode connected to the second voltage induction line,
    wherein the first area is larger than the second area, the first interval is smaller than the second interval, the power supply line and the first voltage induction line form a capacitance of a first capacitor, and the power supply line and the second voltage induction line form a capacitance of a second capacitor, and
    wherein the LED is driven because the capacitance of the first capacitor is larger than that of the second capacitor.

2. The device of claim 1, wherein the fluorescent lamps are disposed in a first direction, the balance PCBs are disposed in a second direction perpendicular to the first direction, and the first and second voltage induction lines are printed on the balance PCBs in the second direction.

3. The device of claim 1, wherein a base of the balance PCB is made of an insulation material, the power supply line and the first voltage induction line form a first capacitor with the base of the balance PCB interposed therebetween, and the power supply line and the second voltage induction line form a second capacitor with the base of the balance PCB interposed therebetween.

4. The device of claim 2, wherein the LED is driven by the difference between the voltage induced to the first capacitor and the voltage induced to the second capacitor when power is applied to the power supply line.

5. The device of claim 1, wherein the fluorescent lamp is an external electrode fluorescent lamp.

* * * * *